United States Patent [19]
Kakimoto et al.

[11] Patent Number: 5,069,431
[45] Date of Patent: Dec. 3, 1991

[54] BUSH ASSEMBLY

[75] Inventors: Toshihiko Kakimoto; Takuya Murakami, both of Kanagawa, Japan

[73] Assignee: Nissan Motor Company, Limited, Yokohama, Japan

[21] Appl. No.: 657,267

[22] Filed: Feb. 15, 1991

Related U.S. Application Data

[63] Continuation of Ser. No. 259,818, Oct. 19, 1988, abandoned.

[30] Foreign Application Priority Data

Oct. 19, 1987 [JP] Japan ................................ 62-261772

[51] Int. Cl.$^5$ ................................................ F16F 1/38
[52] U.S. Cl. ..................................... 267/141; 267/280; 384/153; 277/152; 277/212 FB; 403/228; 280/673
[58] Field of Search ................ 280/673; 267/292, 293, 267/270, 269, 279, 280, 152, 140.1; 403/225, 228, 221; 384/222, 151, 153, 215; 277/207 R, 208, 102, 152, 212 FB

[56] References Cited

U.S. PATENT DOCUMENTS

| 3,304,136 | 2/1967 | Muller | 384/153 |
| 4,017,089 | 4/1977 | Kurata et al. | 277/152 |
| 4,557,354 | 12/1985 | Sakakibara | 277/212 FB |
| 4,709,789 | 12/1987 | Czich et al. | 277/212 FB |
| 4,744,677 | 5/1988 | Tanaka et al. | 403/225 |
| 4,809,960 | 3/1989 | Kakimoto et al. | 384/153 |

FOREIGN PATENT DOCUMENTS

| 1939597 | 2/1970 | Fed. Rep. of Germany | 384/484 |
| 1038099 | 9/1953 | France | 277/152 |
| 63-152723 | 6/1988 | Japan | 384/153 |
| 1325234 | 7/1987 | U.S.S.R. | 277/152 |

Primary Examiner—Charles A. Marmor
Assistant Examiner—Karin Tyson
Attorney, Agent, or Firm—Foley & Lardner

[57] ABSTRACT

A bush assembly includes an inner cylindrical member for supporting an elongated member, a rigid sleeve slideably fixed to the outer surface of the inner cylindrical member via a slipping member, and an outer cylindrical member fixed to the outer surface of the rigid sleeve via an elastic member. The rigid sleeve has a greater diameter portion at one end thereof so that an annular space is formed between the greater diameter portion and one end of the inner cylindrical member. The bush assembly further includes a sealing member which is disposed in the annular space for preventing muddy water or the like from getting into the interfaces between the slipping member and the inner cylindrical member and between the slipping member and the rigid sleeve. The sealing member includes an outer portion fixed to the rigid sleeve, an inner portion being brought into contact with the inner cylindrical member, and an intermediate portion arranged therebetween. The intermediate portion has an annular corrugated wall which extends between the inner and outer portions.

6 Claims, 3 Drawing Sheets

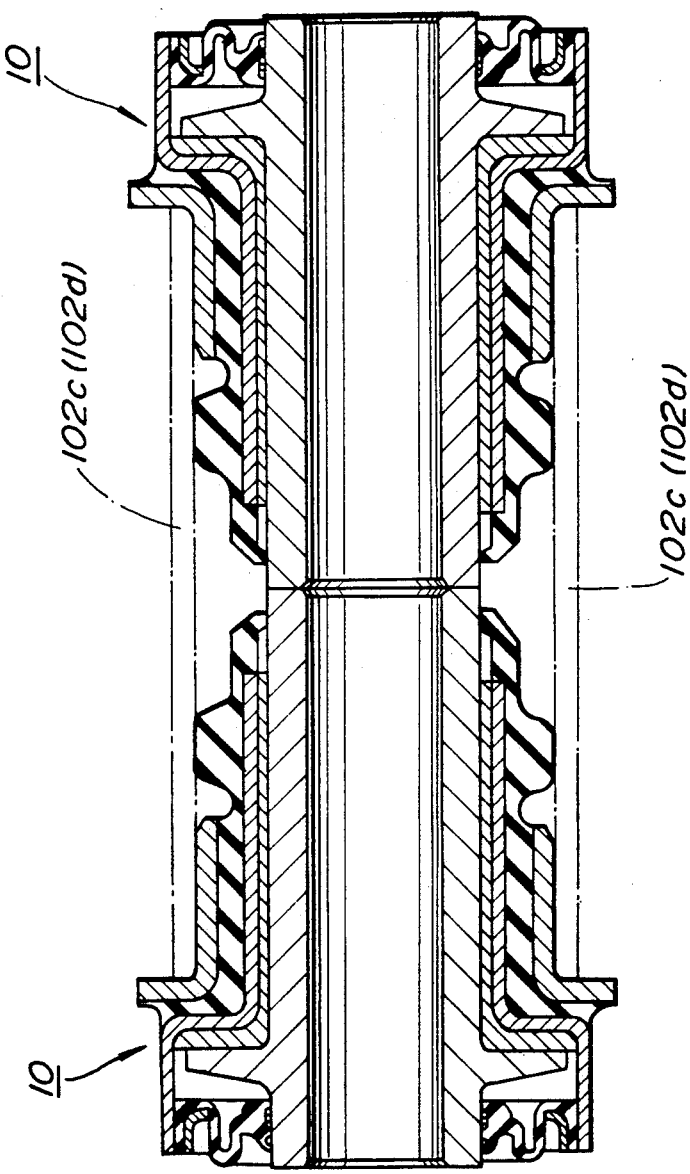

BUSH ASSEMBLY

This application is a continuation of application Ser. No. 259,818, filed Oct. 19, 1988, now abandoned.

BACKGROUND OF THE INVENTION

Field of the Invention

The present invention relates generally to a bush assembly used for securing an elongated member to a stationary base. More specifically, the invention relates to a bush assembly or a slipping bush which can be used for fixing the upper arm of a double wishbone type suspension to a vehicle body.

According to our previous unpublished invention, the upper arm of a double wishbone type suspension is fixed to a vehicle body by means of a bush assembly and a supporting pin inserted into the inner space of the bush assembly. As shown in FIG. 1, such a bush assembly generally comprises an inner cylindrical member 1, an outer cylindrical member 2 arranged so that the axis thereof coincides with that of the inner cylindrical member 1, and a rigid sleeve 3 provided therebetween. The rigid sleeve 3 is fixed to the inner surface of the outer cylindrical member 2 by means of an elastic member 4, and slidably engages the outer surface of the inner cylindrical member 1 via a slipping member 5.

In such a bush assembly, since the slipping member 5 is slidably in contact with the inner cylindrical member 1 and the rigid sleeve 3, if muddy water or the like gets into the interface between the slipping member 5 and the inner cylindrical member 1 or the rigid sleeve 3 from the outside, the bush assembly tends to corrode and wear, so that the duration of life of the bush assembly is decreased.

In order to prevent muddy water or the like from getting into the interface, in a the bush assembly shown in FIG. 1, a sealing member 6 is provided in an annular space defined by an end portion 1a of the inner cylindrical member 1 and the greater diameter portion 3a of the rigid sleeve 3. A related construction is illustrated in the Japanese Patent First (unexamined) Publication Showa 62-127934.

In our bush assembly of FIG. 1, the outer portion 6a of the sealing member 6, in which a ring member 7 is embedded for reinforcement, is fixed to the rigid sleeve 3. On the other hand, and the inner portion 6b thereof is brought into contact with the end portion 1a of the inner cylindrical member 1. With such a construction, there are the following disadvantages. Since the inner portion 6b of the sealing member 6 must be compressed in a radial direction to engage the end portion 1a of the inner cylindrical member 1 in order to achieve a desired seal, pressure must be applied to the bearing surface of the inner portion 6b of the sealing member 6, and the inner portion 6b tends to wear. In addition, when the inner cylindrical member 1 rotates in relation to the rigid sleeve 3, the inner portion 6b of the sealing member 6 can not easily slide around the inner cylindrical member 1, so that a bad seal tends to occur.

SUMMARY OF THE INVENTION

It is therefore a principal object of the present invention to eliminate the aforementioned disadvantage and to provide a bush assembly having a sealing member which prevents water or the like from getting into the interior of the assembly.

In order to accomplish the aforementioned and other specific objects, a bush assembly, according to the present invention, includes a sealing member with a thinner intermediate portion which defines an annular corrugated diaphram.

According to one aspect of the present invention, a bush assembly used for connecting a first member having an essentially cylindrical opening to a second member, comprises:

an inner cylindrical member for supporting an elongated member which engages the second member;

an outer cylindrical member which engages the opening of the first member.

a rigid sleeve between the inner and outer cylindrical members having a greater inner diameter portion at one end to form an annular space;

an elastic member fixed to the outer cylindrical member and to the rigid sleeve;

a slipping member between the rigid sleeve and the inner cylindrical member; and a sealing member in the annular space having an intermediate wall portion which defines an annular corrugated diaphram extending between the greater diameter portion and the end portion of the inner cylindrical member.

The sealing member may include an outer portion fixed to the rigid sleeve, and an inner portion which slidably contacts the inner cylindrical member. The thickness of the wall portion is preferably less than that of the inner and outer portions. The bush assembly may further comprise a ring member which is embedded in the outer portion of the sealing member for reinforcement.

BRIEF DESCRIPTION THE DRAWINGS

FIG. 4 is a longitudinal sectional view of the preferred embodiment of a bush assembly according to the present invention, when the assembly is inserted into a through opening formed in the upper arm of the double wishbone type suspension of FIG. 3.

DESCRIPTION OF THE PREFERRED EMBODIMENT

Figure 1:
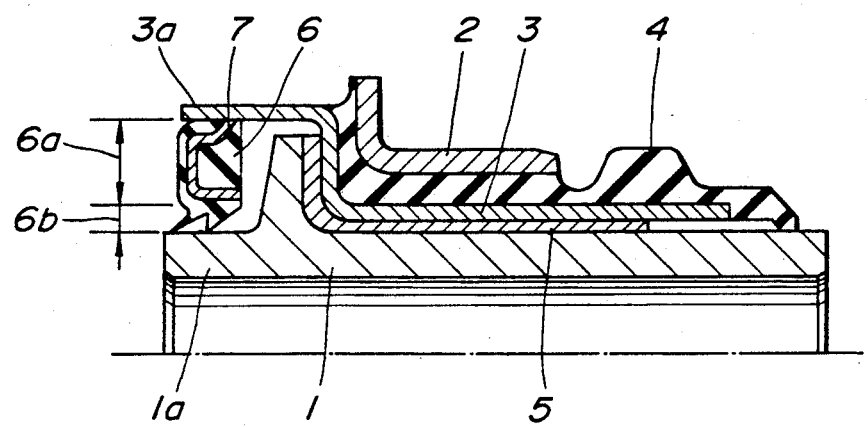
FIG. 1 is a longitudinal sectional view of a bush assembly in the prior art.
Figure 2:
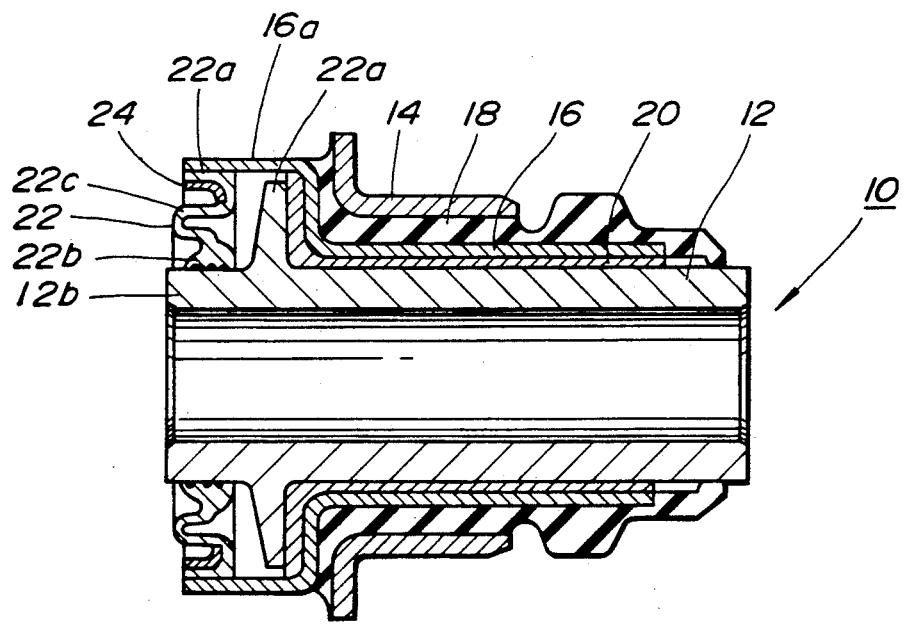
FIG. 2 is a longitudinal sectional view of the preferred embodiment of a bush assembly according to the present invention.

Referring now to the drawings, particularly to FIG. 2, a bush assembly 10 includes an essentially cylindrical inner member 12 and an essentially cylindrical outer member 14. The outer cylindrical member 14 is arranged so that the central axis thereof coincides with that of the inner cylindrical member 12, and an essentially cylindrical rigid sleeve 16 is arranged between the inner and outer cylindrical members 12 and 14. The outer surface of the rigid sleeve 16 is fixed to the inner surface of the outer cylindrical member 14 via an elastic member 18 by vulcanizing the elastic member 18. The inner surface of the rigid sleeve 16 slidably engages the outer surface of the inner cylindrical member 12 via a slipping member 20.

The inner cylindrical member 12 has a radially extending flange portion 12a at a location neighboring one end thereof, and the rigid sleeve 16 has a greater inner diameter portion 16a at one end thereof, so that an annular space is formed between the greater inner diameter portion 16a of the rigid sleeve 16, and the radially extending flange portion 12a and an end portion 12b of the inner cylindrical member 12. A sealing member 22 is provided in the annular space.

The outer portion 22a of the sealing member 22, in which a ring member 24 is buried for reinforcement, is fixed to the greater diameter portion 16a of the rigid sleeve 16. On the other hand, the inner portion 22b of the sealing member 22 slidably contacts the end portion 12b of the inner cylindrical member 12. The sealing member 22 has an intermediate wall portion 22c which defines an annular corrugated diaphram extending between the rigid sleeve 16 and the inner cylindrical member 12. The thickness of the intermediate wall portion 22c is preferably less than that of other portions of the sealing member 22.

Figure 3:
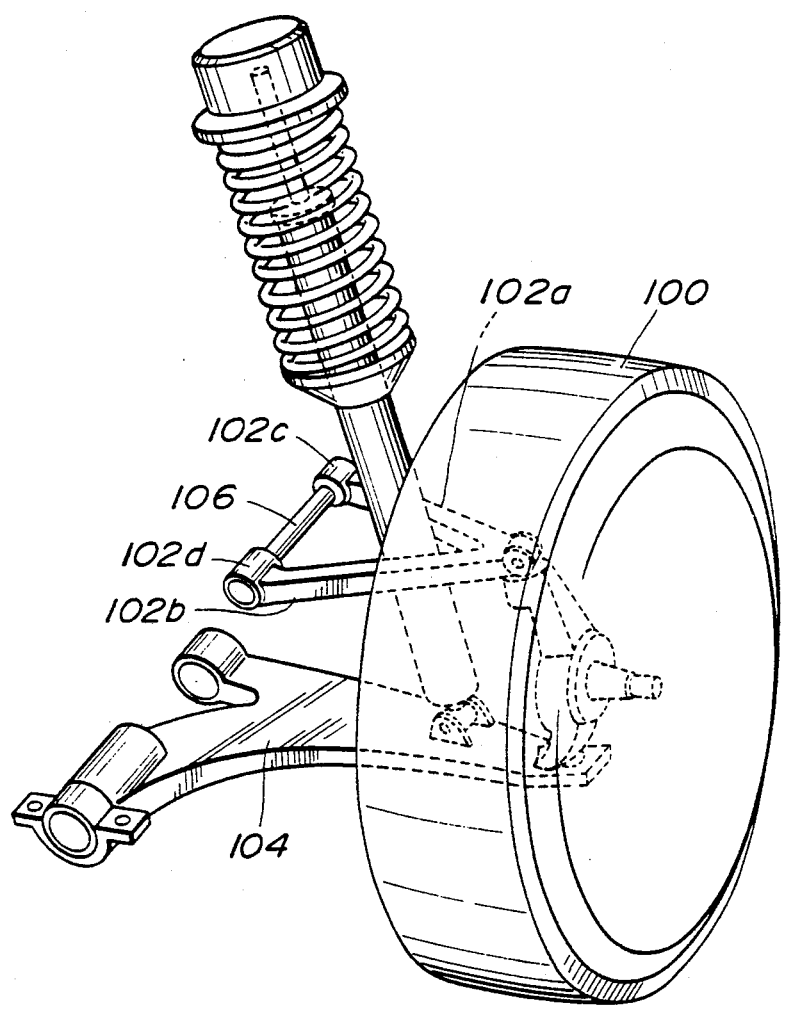
FIG. 3 is a perspective view of a double wishbone type suspension in which the bush assembly of FIG. 2 is used.

A bush assembly 10, according to the present invention, may be used for double wishbone type suspensions. As shown in FIG. 3, in double wishbone type suspensions, a wheel 100 is supported on the vehicular body not shown via upper and lower arms 102 and 104. The upper arm branches and has two fork arm portions 102a and 102b. The respective free ends of the fork arm portions 102a and 102b are provided with holding portions 102c and 102d which have essentially cylindrical through openings. A pair of bush assemblies are inserted into each of the through openings of the holding portions 102c and 102d. The bush assemblies are arranged as shown in FIG. 4. After inserting the two sets of bush assemblies into the through openings of the holding portions 102c and 102d, a supporting pin 106 is inserted into the inner cylindrical members 12.

With the aforementioned constructions, when an external force is applied to the inner or outer cylindrical member 12 or 14, the elastic member 18 provided between the outer cylindrical member 14 and the rigid sleeve 16 is elastically deformed. Therefore, for example, vibration and so forth applied to the outer cylindrical member 14 via the wheel 100 and the upper arm 102 are absorbed in the elastic member 18, so that it is possible to prevent the latter from being transmitted to the inner cylindrical member, the supporting pin 106 and the vehicle body. In addition, since the slipping member 20 is provided between the rigid sleeve 16 and the inner cylindrical member 12, the rigid sleeve can be rotated in relation to the inner cylindrical member 12, i.e. the outer cylindrical member 14 can be rotated in relation to the inner cylindrical member 12.

The sealing member 22 serves to prevent muddy water or the like from getting into the interfaces between the slipping member 20 and the inner cylindrical member 12, and between the slipping member 20 and the rigid sleeve 16, so that corrosion is avoided, thereby duration of life of the bush assembly is increased.

According to the present invention, even if the axis of the inner cylindrical member 12 does not coincide with with the rigid sleeve 16, the sealing surface of the sealing member 22 can effectively contact the end portion 12b of the inner cylindrical member 12 so that good sealing engagement therebetween can be achieved, since the sealing member 22 has the intermediate flexible corrugated wall portion 22b. According to the present invention, pressure applied to the sealing surface 22d of the sealing member 22 is less than that of conventional bush assemblies, so that the frictional force applied thereto is also less than that of conventional bush assemblies. Therefore, it is possible to prevent the sealing member 22 from wearing quickly. In addition, when the inner cylindrical member 12 rotates in relation to the rigid sleeve 16, the intermediate wall portion 22c can be easily deformed while the sealing surface 22d of the sealing member 22 remains in contact with the end portion 12b of the inner cylindrical member 12, so that it is possible to prevent gaps in the seal from occuring.

Although a bush assembly of the invention is used for fixing the upper arm of a double wishbone type suspension, the bush assembly of the invention can be generally used for receiving an elongated member for connecting a first member, which engages the elongated member, to a second member which engages the outer cylindrical member of the bush assembly, according to the present invention.

What is claimed is:

1. A bush assembly used for connecting a first member having an essentially cylindrical opening to a second member, said bush assembly comprising:

an inner cylindrical member defining therein an essentially cylindrical space for supporting an elongated member which engages said second member;

an outer cylindrical member which engages said opening of the first member, said outer cylindrical member being arranged so that the axis thereof substantially coincides with the axis of said inner cylindrical member;

a rigid sleeve arranged between said inner and outer cylindrical members, said rigid sleeve having a greater inner diameter portion at one end thereof so as to form an annular space between said greater inner diameter portion and said inner cylindrical member;

an elastic member, one surface of which is fixed to said outer cylindrical member, and the other surface of which is fixed to said rigid sleeve;

a slipping member arranged between said rigid sleeve and said inner cylindrical member so that said rigid sleeve slidably engages said inner cylindrical member;

a sealing member disposed in said annular space, said sealing member having a fixed portion at one end thereof, in which said sealing member is fixed to one of said rigid sleeve and said inner cylindrical member, a sealing portion at the other end thereof, in which said sealing member contacts the other of said rigid sleeve and said inner cylindrical member, and an intermediate wall portion which defines an annular corrugated diaphragm extending between said greater inner diameter portion and said end portion of said inner cylindrical member; and a ring member for reinforcing said fixed portion of said sealing member, said ring member essentially extending in the direction of the axis of said greater inner diameter portion of said rigid sleeve, so as to reinforce essentially the whole of said fixed portion of said sealing member.

2. A bush assembly as set forth in claim 1, wherein the thickness of said intermediate wall portion is less than that of said fixed and sealing portions.

3. A bush assembly as set forth in claim 1, which wherein said ring member is embedded in said fixed portion of said sealing member for reinforcement.

4. A bush assembly used for fixing the upper arm of a double wishbone type suspension for a vehicle body, which comprises:

an inner cylindrical member defining therein an essentially cylindrical space for supporting an elongated member connected to said vehicle body;

an outer cylindrical member engaging said upper arm, said outer cylindrical member being arranged so that the axis thereof substantially coincides with the axis of said inner cylindrical member;

a rigid sleeve arranged between said inner and outer cylindrical members, said rigid sleeve having a greater inner diameter portion at one end thereof so as to form an annular space between said greater inner diameter portion and said inner cylindrical member;

an elastic member, one surface of which is fixed to said outer cylindrical member, and the other surface of which is fixed to said rigid sleeve;

a slipping member arranged between said rigid sleeve and said inner cylindrical member so that said rigid sleeve slidably engages said inner cylindrical member;

a sealing member disposed in said annular space, said sealing member having a fixed portion at one end thereof, in which said sealing member is fixed to one of said rigid sleeve and said inner cylindrical member, a sealing portion at the other end thereof, in which said sealing member contacts the other of said rigid sleeve and said inner cylindrical member, and an intermediate wall portion which defines an annular corrugated diaphragm extending between said greater inner diameter portion and said end portion of said inner cylindrical member; and a ring member for reinforcing said fixed portion of said sealing member, said ring member essentially extending in the direction of the axis of said greater inner diameter portion of said rigid sleeve, so as to reinforce essentially the whole of said fixed portion of said sealing member.

5. A bush assembly as set forth in claim 4, wherein the thickness of said intermediate wall portion is less than that of said fixed and sealing portions.

6. A bush assembly as set forth in claim 4, wherein said ring member is embedded in said fixed portion of said sealing member for reinforcement.

* * * * *